Feb. 16, 1954 — C. H. BECKER — 2,669,641
FOOD CARRYING AND PREPARATION CASE
Filed Nov. 29, 1950
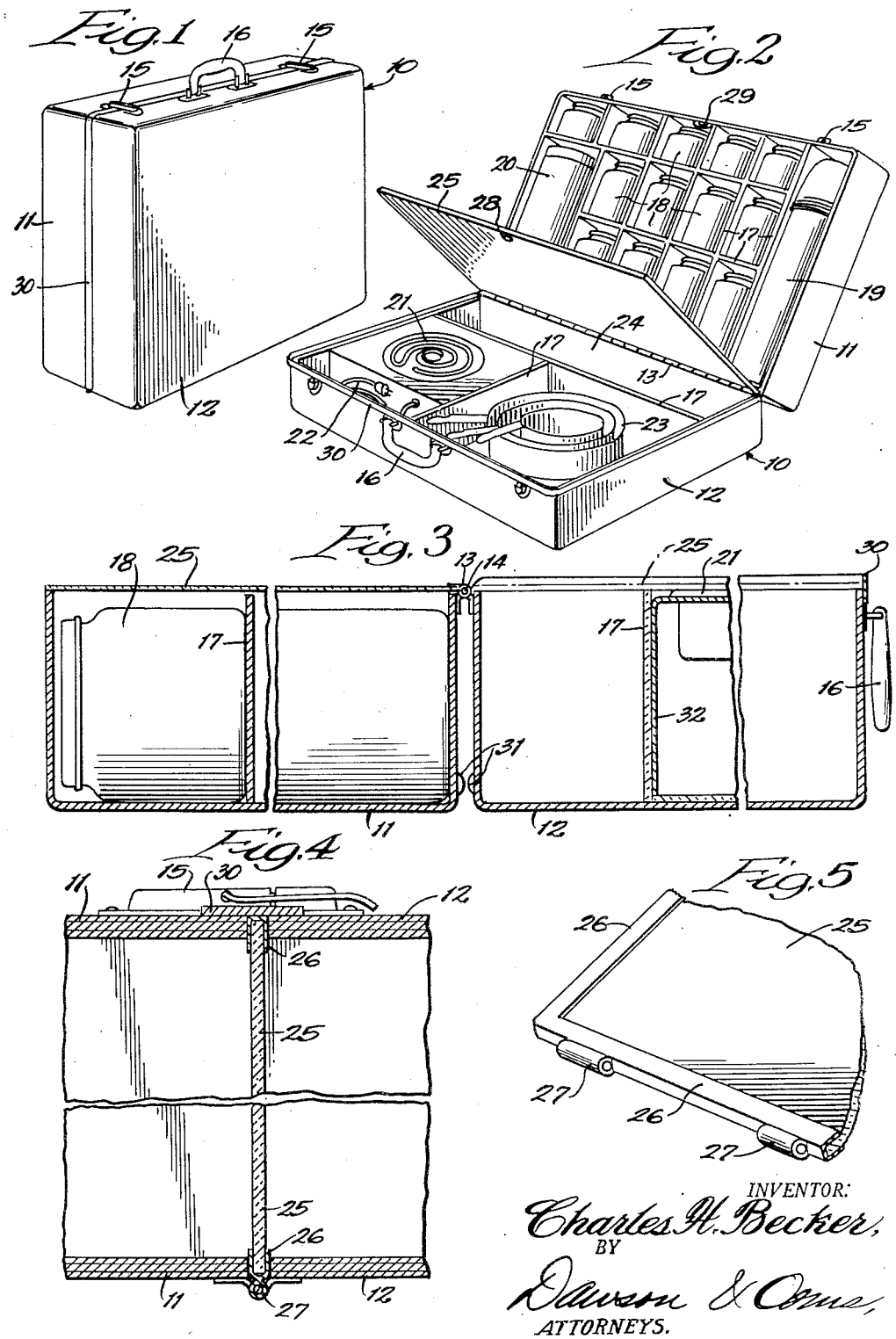
INVENTOR:
Charles H. Becker,
BY
Dawson & Comes,
ATTORNEYS.

Patented Feb. 16, 1954

2,669,641

UNITED STATES PATENT OFFICE 2,669,641

FOOD CARRYING AND PREPARATION CASE

Charles H. Becker, Ironwood, Mich.

Application November 29, 1950, Serial No. 198,127

1 Claim. (Cl. 219—19)

My invention relates to a food carrying and preparation case. More specifically my invention relates to a portable case adapted for the carrying of the various food products required by infants and to the preparation of such infant foods which are required to be heated or cooked.

The varied and extensive food requirements for infant feeding present a difficult problem when it is desired to travel with the infant away from home. This problem is further complicated by the fact that it is necessary to cook or heat most of the foods used in infant feeding, which require the use of some sort of heating unit together with pans, dishes, etc. Consequently, a need has long been felt for a food carrying and preparation case which was specifically adapted for use in the feeding of infants while traveling.

It is therefore an object of my invention to provide a portable infant food kit which is adapted for the convenient preparation of infant foods while traveling. It is another object of my invention to devise a food carrying and preparation case which permits an electric heating element to safely be incorporated therein. More specifically, it is an object of my invention to provide a case containing a resistance heating element which can be closed immediately after using the heating element without presenting a fire hazard or endangering the contents of the case. It is a further object of my invention to devise a case which provides compartments for the storage of various canned foods and boxed cereals together with a thermos bottle in which sterilized milk or water can be kept, and also compartments for the storage of cooking and food service equipment such as sauce pans, dishes, etc. It is a still further object of my invention to devise a case which when opened will provide a table, and when closed will securely retain the contents within their respective compartments. Further objects and advantages will appear as the specification proceeds.

I have found that the above objects can be substantially accomplished by providing a case having two hinged box-like portions equipped with partitions to form compartments and having an electric heating element located within one of the compartments. I have also found that it is highly advantageous to hinge a sheet of fireproof insulating material such as asbestos to the hinged edge of the complementary box-like receptacles so that this sheet can serve as a table top when the case is open, while retaining the contents within their compartments and providing a protection of the contents from damage by the heating element when the case is closed.

My invention is illustrated in a preferred embodiment in the accompanying drawing, in which—

Figure 1 is a perspective view of my case when closed and sitting in an upright position; Fig. 2, a perspective view of my case when open showing the various contents contained within the compartments and the insulating sheet hinged between the top and bottom of the case; Fig. 3, a fragmentary sectional view taken centrally through the heating element; Fig. 4, a fragmentary sectional view showing the position of the insulating sheet when the case is closed; and Fig. 5, a partial perspective view of a type of insulating sheet that can be used in my case.

In the illustration given, 10 designates a case or box having complementary sections 11 and 12 composing the top and bottom of the case. I prefer to have case portions 11 and 12 of substantially the same size in order that the case may be opened to form two box-like receptacles lying side by side in horizontal alignment, as shown more clearly in Fig. 3. This allows both the top portion 11 and the bottom portion 12 to be supported on a horizontal surface when the case is open. Case portions 11 and 12 can be constructed of any suitable material such as metal or wood. In the embodiment shown, plywood is used.

Box-like sections 10 and 11 are secured together along one edge by means of a hinge 13 having a hinge pin 14. In the illustration given, a piano hinge is used which extends for the full length of case 10. To hold the top and bottom compartments 11 and 12 together clamp-type latches 15 are provided on the opposite side of the case from hinge 13. To assist in carrying the case a handle 16 is provided. Such handle and latch construction is well-known, and it will be apparent that various modifications can be used.

The case portions 11 and 12 are sub-divided into compartments by means of partitions. In the embodiment shown, these partitions are designated generally as 17. Although these partitions can be installed in any suitable way to form compartments of the desired shape, I prefer to equip the top case portion 11 with a lattice of partitions to provide compartments for the storage of canned foods and a somewhat larger compartment in top 11 to receive a thermos bottle, and also a larger compartment for the storage of packaged cereals. In Fig. 2, the latter compartments are respectively designated as 19 and 20.

As seen best in Fig. 2, I prefer to locate a resistance heating element 21 within a compartment in case bottom 12. Resistance heating element 21 may be of any suitable type, such as the conventional electric hot plate. Electric hot plate 21 is equipped with a cord 22 adapted to be plugged into an electric outlet. In the illustration given, in a compartment adjacent heating element 21 I provide pans and dishes 23. The elongated compartment 24, as shown in Fig. 2, can be sub-divided and adapted in various ways for the storage of items such as spoons, can openers, etc.

I have discovered that the structure thus far described can be greatly enhanced in utility by providing a fire-proof, insulating sheet 25 between top portion 11 and bottom portion 12. I prefer to make sheet 25 of substantially the same size both in length and width as the tops of case portions 11 and 12. Sheet 25 can be composed of any suitable fire-proof and insulating material such as asbestos. Sheet 25 can be hinged to the hinged edge of case 10 either parallel to hinge 13 or hinged by hinge 13. I prefer, however, to attach hinged sheet 25 and case portions 11 and 12 all on the same hinge, such as hinge 13. This enables sheet 25 to be rotated onto the top of either case section 11 or 12 when the case is open and form a horizontal surface which can be used as a table. If an asbestos sheet is used, as I prefer, the sheet 25 can readily be adapted for hinging by providing a metal edging 26 channeled to grip the edges of sheet 25 and having integrally formed hinge barrels 27 to be received on hinge pin 14 together with the hinge barrels attached to box portions 11 and 12.

It is desirable to equip the upper edge of sheet 25 with a latch member 28 cooperating with a latch member 29 secured to the inner edge of top 11, which allows sheet 25 to be latched to top 11 when opening or closing case 10. I have also found it desirable to attach a metal strip 30 to the upper edge of case bottom 12 to provide for a snugger closure between case portions 11 and 12. In order to prevent the rear sides of case portions 11 and 12 from striking each other, it is preferable to provide abutting stops 31 on the outer surfaces of the rear sides of case portions 11 and 12.

As seen more clearly in Fig. 3 the compartment containing heating element 21 is lined with an insulating and fire-proof material 32 on the sides and bottom of the compartment. This material is preferably asbestos.

Operation

The convenience provided by the structure of my food carrying and preparation case can best be appreciated by visualizing its operation. Preparatory to going on a trip case 10 is packed with various food products such as canned foods and package cereals, and a thermos bottle containing sterilized water or milk is placed within compartment 19. Various utensils, dishes, and other equipment for food preparation are placed within the compartments indicated in Fig. 2. The cooperating sections 11 and 12 of case 10 are then closed and secured together by means of latches 15. When it is desired to prepare food for the infant case 10 is opened so that top case portion 11 and bottom case portion 12 are in horizontal alignment. In this position the open case can be readily supported on a horizontal surface such as a seat in an automobile, etc. It will be noted that sheet 25, being latched to top 11 prevents the contents of top 11 from spilling out when opening or closing the case, and also serves to retain the contents of the compartments in case bottom 12 when the case is closed.

After case 10 has been opened and placed on a horizontal surface, the food which it is desired to prepare is removed from the compartments in top 11. While this is being accomplished sheet 25 can be resting on the top of case portion 12, and thereby providing a table for holding the food removed from the compartments within top 11. After the desired food has been selected, sheet 25 can be rotated upon hinge 13 to rest on top portion 11. In this position sheet 25 also provides a table for use in the preparation of the foods. The cord 22 of heating element 21 is then connected to an electric outlet. Pans 23 can then be placed on burner 21 to heat the selected foods. Upon completion of the heating of the foods the case can safely be closed without presenting a fire hazard or endangering the contents of the case. This is true because sheet 25 is composed of a fire-proof insulating material such as asbestos.

Besides allowing the case to be closed immediately after using the burner, asbestos sheet 25 is important in protecting an infant from coming in contact with the heated element, which would generally be used in its near vicinity. For example, if it is desired to have element 21 heating up while preparing the food to be cooked, sheet 25 can be folded upon element 21 and thus prevent an infant from coming in contact with it. Similarly, after the cooking is completed, even though it is not desired to close the case, sheet 25 can be used to prevent the baby from coming in contact with the hot element by placing it on top of the burner. Another important advantage provided by my structure is that the compartment provided in bottom receptacle 12 for pans 23 can also be used to keep foods hot after they have been heated on the resistance element. This can be accomplished by simply placing the pan containing the heated food within the compartment provided for pans 23 and lowering sheet 25 onto bottom portion 12. It will be noted that the metal strip 30 cooperates with the edges of sheet 25 to produce a tight seal with the compartments in bottom portion 12 which is especially advantageous when it is desired to keep food hot by placing it in a compartment within bottom section 12.

While in the foregoing specification I have described a specific embodiment of my invention giving numerous details of the structure of my food carrying and preparation case for the purpose of illustration, it will readily be understood that many of these details can be varied widely by those skilled in the art without departing from the spirit of my invention.

I claim:

A portable food case, comprising two complementary receptacles having side and bottom walls with an open top, said receptacles being of substantially the same size to extend upwardly an equal distance when lying side-by-side, hinge means connecting said receptacles along the top of corresponding sides and thereby allowing said receptacles to be folded together to form a closed case, partitions secured within said receptacles to form open-topped compartments, one of said compartments having heating means permanently mounted therein and providing a heating surface disposed generally parallel to the bottom wall of said compartment and accessible through the open top of said compartment, and a sheet of insulating fire-proof material hinged between said receptacles and seatable alternately on top of both of said receptacles to provide a closure selectively for either of said receptacles when said case is open with said receptacles in side-by-side relation, said sheet being dimensioned and arranged to cover all of the compartments in each of said receptacles when seated thereon, whereby contact with said heating surface is prevented when said sheet is seated on the receptacle containing said heating means.

CHARLES H. BECKER.

References Cited in the file of this patent

UNITED STATES PATENTS

| Number | Name | Date |
| --- | --- | --- |
| 1,056,130 | Smith | Mar. 18, 1913 |
| 1,235,097 | Berg | July 31, 1917 |
| 1,476,144 | Calvert | Dec. 4, 1923 |
| 1,879,880 | Lindsey | Sept. 27, 1932 |
| 2,301,630 | Krienitz | Nov. 10, 1942 |
| 2,441,345 | Brubaker | May 11, 1948 |
| 2,458,837 | Dougherty | Jan. 11, 1949 |
| 2,505,405 | Jarboe | Apr. 25, 1950 |
| 2,584,435 | Doerr | Feb. 5, 1952 |